United States Patent
Mukaigaito et al.

(10) Patent No.: US 11,061,278 B2
(45) Date of Patent: Jul. 13, 2021

(54) WAVELENGTH CONVERSION MEMBER, BACK LIGHT UNIT, IMAGE DISPLAY DEVICE, RESIN COMPOSITION FOR WAVELENGTH CONVERSION, AND RESIN CURED PRODUCT FOR WAVELENGTH CONVERSION

(71) Applicant: Hitachi Chemical Company, Ltd., Tokyo (JP)

(72) Inventors: Kouhei Mukaigaito, Tokyo (JP); Shigeaki Funyu, Tokyo (JP); Hiroaki Takahashi, Tokyo (JP); Tomoyuki Nakamura, Tokyo (JP); Masato Fukui, Tokyo (JP); Takanori Kajimoto, Tokyo (JP); Yoshitaka Katsuta, Tokyo (JP); Tatsuya Yahata, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 0 days.

(21) Appl. No.: 16/651,803

(22) PCT Filed: Sep. 29, 2017

(86) PCT No.: PCT/JP2017/035726
§ 371 (c)(1),
(2) Date: Mar. 27, 2020

(87) PCT Pub. No.: WO2019/064590
PCT Pub. Date: Apr. 4, 2019

(65) Prior Publication Data
US 2020/0241361 A1    Jul. 30, 2020

(51) Int. Cl.
*F21V 7/22* (2018.01)
*G02F 1/13357* (2006.01)
*C09K 11/02* (2006.01)

(52) U.S. Cl.
CPC ........ *G02F 1/133606* (2013.01); *C09K 11/02* (2013.01); *G02F 1/133611* (2013.01)

(58) Field of Classification Search
CPC ....... C09K 11/00; C09K 11/02; C09K 11/025; G02F 1/133606; G02F 1/133611
See application file for complete search history.

(56) References Cited

U.S. PATENT DOCUMENTS 8,946,982 B2 * 2/2015 Winkler ............... C09K 11/025
                                                              313/486
10,539,297 B2 * 1/2020 Miller ....................... F21V 9/30
(Continued)

FOREIGN PATENT DOCUMENTS

JP    2001-166104 A    6/2001
JP    2007-119310 A    5/2007
(Continued)

OTHER PUBLICATIONS

Decision to Grant a Patent in Japanese Application JP 2019-544187, date of drafting Sep. 9, 2020, together with English language machine translation.

(Continued)

*Primary Examiner* — Andrew J Coughlin
(74) *Attorney, Agent, or Firm* — Fitch, Even, Tabin & Flannery, L.L.P.

(57) ABSTRACT

Provided are a wavelength conversion member including: a quantum dot phosphor; a white pigment including an organic substance layer that contains an organic substance, on at least a part of a surface of the white pigment; and a resin cured product including the quantum dot phosphor and the white pigment.

35 Claims, 2 Drawing Sheets

(56) References Cited

U.S. PATENT DOCUMENTS

| | | | |
|---|---|---|---|
| 2003/0202137 A1 | 10/2003 | Nakamura et al. | |
| 2007/0213245 A1* | 9/2007 | Polonka | C11D 10/04 510/141 |
| 2014/0192538 A1* | 7/2014 | Berix | F21V 13/04 362/308 |
| 2015/0226910 A1* | 8/2015 | Malinoski | B29D 11/00663 362/611 |
| 2017/0075052 A1 | 3/2017 | Saitoh et al. | |
| 2020/0241361 A1* | 7/2020 | Mukaigaito | C08L 101/00 |

FOREIGN PATENT DOCUMENTS

| | | |
|---|---|---|
| JP | 2013-544018 A | 12/2013 |
| JP | 2014-032216 A1 | 2/2014 |
| JP | 2017-103235 A | 6/2017 |
| TW | 201544878 A | 12/2015 |
| WO | 2015/182685 A1 | 12/2015 |
| WO | 2016/052625 A1 | 4/2016 |
| WO | 2016/081219 A1 | 5/2016 |

OTHER PUBLICATIONS

Written Amendment in Japanese Application JP 2019-544187, dated Aug. 26, 2020, together with English language machine translation.
Written Opinion in Japanese Application JP 2019-544187, dated Aug. 26, 2020, together with English language machine translation.
Notice of Reasons for Refusal in Japanese Application JP 2019-544187, date of drafting Jul. 28, 2020, together with English language machine translation.

* cited by examiner

WAVELENGTH CONVERSION MEMBER, BACK LIGHT UNIT, IMAGE DISPLAY DEVICE, RESIN COMPOSITION FOR WAVELENGTH CONVERSION, AND RESIN CURED PRODUCT FOR WAVELENGTH CONVERSION

CROSS-REFERENCE TO RELATED APPLICATIONS

This application is a U.S. national phase application filed under 35 U.S.C. § 371 of International Application No. PCT/JP2017/035726, filed Sep. 29, 2017, designating the United States, the entire contents of which are hereby incorporated herein by reference.

TECHNICAL FIELD

The present invention relates to a wavelength conversion member, a back light unit, an image display device, a resin composition for wavelength conversion, and a resin cured product for wavelength conversion.

BACKGROUND ART

In the field of image display devices, such as liquid crystal display devices, an improvement in color reproducibility of displays has been required in recent years. As means for improving the color reproducibility, wavelength conversion members containing quantum dot phosphors are drawing attention, as disclosed in Japanese National-Phase Publication (JP-A) No. 2013-544018 and WO 2016/052625.

A wavelength conversion member containing a quantum dot phosphor is disposed, for example, in a back light unit of an image display device. In a case in which a wavelength conversion member containing a quantum dot phosphor which emits red light and a quantum dot phosphor which emits green light is used, and when blue light as an exciting light is irradiated to the wavelength conversion member, it is possible to obtain white light by the combination of the red light and green light emitted from the quantum dot phosphors as well as the blue light transmitted through the wavelength conversion member. By the development of wavelength conversion members containing quantum dot phosphors, the color reproducibility of displays has been improved from a conventional NTSC (National Television System Committee) ratio of 72% to a NTSC ratio of 100%.

A wavelength conversion member containing a quantum dot phosphor usually includes a cured product obtained by curing a curable composition containing the quantum dot phosphor. Curable compositions can be categorized into heat curable compositions and photocurable compositions, and photocurable curable compositions are preferably used from the viewpoint of improving productivity.

SUMMARY OF INVENTION

Technical Problem

Wavelength conversion members containing quantum dot phosphors may sometimes fail to provide a satisfactory emission intensity.

For the purpose of improving the emission intensity of a wavelength conversion member containing a quantum dot phosphor, particles for scattering light may be incorporated into the wavelength conversion member. However, even in the case in which particles for scattering light are incorporated into the wavelength conversion member, the emission intensity may not be sufficiently improved owing to insufficient scattering efficiency. Further, the particles added to a curable composition may aggregate or precipitate in the composition, possibly causing problems in the production of the wavelength conversion member.

The present disclosure has been made in view of the above described problems. An object of the present disclosure is to provide a wavelength conversion member having a superior emission intensity, as well as a back light unit and an image display device using the same. Another object of the present disclosure is to provide a resin composition for wavelength conversion in which the aggregation or precipitation of particles is suppressed, and a resin cured product for wavelength conversion using the same.

Solution to Problem

Specific means for solving the above mentioned problems are as follows.

<1> A wavelength conversion member, including:
a quantum dot phosphor;
a white pigment having an organic substance layer that includes an organic substance, on at least a part of a surface of the white pigment; and
a resin cured product including the quantum dot phosphor and the white pigment.

<2> The wavelength conversion member according to <1>, wherein the organic substance includes at least one of a polyol or an organic silane.

<3> The wavelength conversion member according to <1> or <2>, wherein the content of the white pigment is from 0.1% by mass to 2.0% by mass with respect to a total amount of the resin cured product.

<4> The wavelength conversion member according to any one of <1> to <3>, wherein the white pigment includes titanium oxide.

<5> The wavelength conversion member according to <4>, wherein the titanium oxide includes a rutile-type titanium oxide.

<6> The wavelength conversion member according to any one of <1> to <5>, wherein the white pigment has a metal oxide layer containing a metal oxide, on at least a part of the surface of the white pigment.

<7> The wavelength conversion member according to <6>, wherein the metal oxide layer and the organic substance layer are provided in this order on the surface of the white pigment.

<8> The wavelength conversion member according to <6> or <7>, wherein the metal oxide layer includes: a first metal oxide layer containing silicon dioxide; and a second metal oxide layer containing aluminum oxide.

<9> The wavelength conversion member according to any one of <1> to <8>, wherein the white pigment has an average particle size of from 0.1 μm to 1 μm.

<10> The wavelength conversion member according to any one of <1> to <9>, wherein at least a part of the white pigment is present as primary particles.

<11> The wavelength conversion member according to any one of <1> to <10>, wherein the content of an inorganic substance other than the white pigment and the quantum dot phosphor is 0.5% by mass or less with respect to a total amount of the resin cured product.

<12> The wavelength conversion member according to any one of <1> to <11>, wherein the resin cured product includes an alicyclic structure and a sulfide structure.

<13> The wavelength conversion member according to any one of <1> to <12>, wherein the quantum dot phosphor includes a compound containing at least one of Cd or In.
<14> The wavelength conversion member according to any one of <1> to <13>, wherein the wavelength conversion member is in the form of a film.
<15> The wavelength conversion member according to any one of <1> to <14>, wherein the wavelength conversion member is used for displaying an image.
<16> The wavelength conversion member according to any one of <1> to <15>, wherein the wavelength conversion member includes a coating material that coats at least a part of the resin cured product.
<17> The wavelength conversion member according to <16>, wherein the coating material has a barrier property with respect to at least one of oxygen or water.
<18> A back light unit, including:
the wavelength conversion member according to any one of <1> to <17>; and
a light source.
<19> An image display device, including the back light unit according to <18>.
<20> A resin composition for wavelength conversion, the resin composition including:
a quantum dot phosphor; and
a white pigment having an organic substance layer that includes an organic substance, on at least a part of a surface of the white pigment.
<21> The resin composition for wavelength conversion according to <20>, wherein the organic substance includes at least one of a polyol or an organic silane.
<22> The resin composition for wavelength conversion according to <20> or <21>, wherein the content of the white pigment is from 0.1% by mass to 2.0% by mass.
<23> The resin composition for wavelength conversion according to any one of <20> to <22>, wherein the white pigment includes titanium oxide.
<24> The resin composition for wavelength conversion according to <23>, wherein the titanium oxide includes a rutile-type titanium oxide.
<25> The resin composition for wavelength conversion according to any one of <20> to <24>, wherein the white pigment has a metal oxide layer that includes a metal oxide, on at least a part of a surface of the white pigment.
<26> The resin composition for wavelength conversion according to <25>, wherein the metal oxide layer and the organic substance layer are provided in this order on the surface of the white pigment.
<27> The resin composition for wavelength conversion according to <25> or <26>, wherein the metal oxide layer includes: a first metal oxide layer containing silicon dioxide; and a second metal oxide layer containing aluminum oxide.
<28> The resin composition for wavelength conversion according to any one of <20> to <27>, wherein the white pigment has an average particle size of from 0.1 μm to 1 μm.
<29> The resin composition for wavelength conversion according to any one of <20> to <28>, wherein at least a part of the white pigment is present as primary particles.
<30> The resin composition for wavelength conversion according to any one of <20> to <29>, wherein the content of an inorganic substance other than the white pigment and the quantum dot phosphor is 0.5% by mass or less.
<31> The resin composition for wavelength conversion according to any one of <20> to <30>, wherein the quantum dot phosphor includes a compound containing at least one of Cd or In.
<32> The resin composition for wavelength conversion according to any one of <20> to <31>, wherein the resin composition includes: a polyfunctional (meth)acrylate compound; a polyfunctional thiol compound; and a photopolymerization initiator.
<33> The resin composition for wavelength conversion according to <32>, wherein the polyfunctional (meth)acrylate compound has an alicyclic structure.
<34> The resin composition for wavelength conversion according to any one of <20> to <33>, wherein the resin composition does not contain a liquid medium, or includes a liquid medium in an amount of 0.5% by mass or less.
<35> The resin composition for wavelength conversion according to any one of <20> to <34>, wherein the resin composition is used for forming a film.
<36> The resin composition for wavelength conversion according to any one of <20> to <35>, wherein the resin composition is used for forming a wavelength conversion member.
<37> A resin cured product for wavelength conversion, wherein the resin cured product is a cured product of the resin composition for wavelength conversion according to any one of
<20> to <36>.

Advantageous Effects of Invention

According to the present disclosure, a wavelength conversion member having a superior emission intensity, as well as a back light unit and an image display device using the same are provided. Further, according to the present disclosure, a resin composition for wavelength conversion in which the aggregation or precipitation of particles is suppressed, and a resin cured product for wavelength conversion using the same are provided.

DESCRIPTION OF EMBODIMENTS

Figure 1:
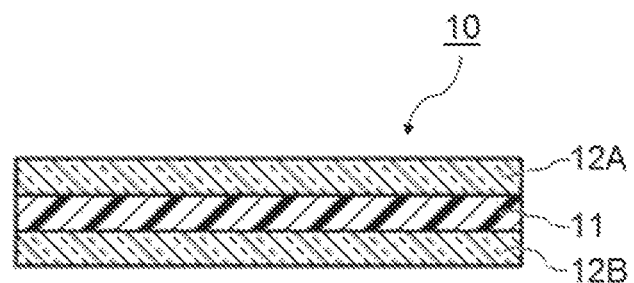
FIG. 1 is a schematic sectional view showing one example of a schematic configuration of a wavelength conversion member.

Embodiments for carrying out the present invention will now be described in detail. It is noted, however, that the invention is in no way limited to the following embodiments. In the following embodiments, constituent elements (including element steps and the like) of the embodiments are not essential, unless otherwise specified. Likewise, numerical values and ranges thereof are not intended to restrict the invention.

In the present disclosure, the definition of the term "step" includes not only an independent step which is distinguishable from another step, but also a step which is not clearly distinguishable from another step, as long as the purpose of the step is achieved.

In the present disclosure, any numerical range described using the expression "from * to" represents a range in which numerical values described before and after the "to" are included in the range as a lower limit value and an upper limit value, respectively.

In a numerical range described in stages, in the present disclosure, the upper limit value or the lower limit value described in one numerical range may be replaced with the upper limit value or the lower limit value in another numerical range described in stages. Further, in a numerical range described in the present disclosure, the upper limit value or the lower limit value in the numerical range may be replaced with a value shown in Examples.

In the present disclosure, each component may include a plurality of kinds of substances corresponding to the component. In a case in which a plurality of kinds of substances corresponding to each component are present in a composition, the content of each component refers to the total content of the plurality of kinds of substances present in the composition, unless otherwise specified.

In the present disclosure, particles corresponding to each component may include a plurality of kinds of particles. In a case in which a plurality of kinds of particles corresponding to each component are present in a composition, the particle size of each component refers to the value of the particle size for a mixture of the plurality of kinds of particles present in the composition, unless otherwise specified.

In the present disclosure, the definition of the term "layer" or "film" includes, when a region in which the layer or film is present is observed, not only the case in which the layer or film is formed over an entire area of the region, but also the case in which the layer or film is formed only in a part of the region.

In the present disclosure, the term "layering" or "layered" means that layers are disposed one on another in layers, and two or more layers may be bound with each other, or two or more layers be detachable from one another.

In the present disclosure, the term "(meth)acryloyl group" refers to at least one of acryloyl group or methacryloyl group; and the term "(meth)acrylic" refers to at least one of acrylic or methacrylic; the term "(meth)acrylate" refers to at least one of acrylate or methacrylate; and the term "(meth)allyl" refers to at least one of allyl or methallyl.

<Wavelength Conversion Member>

A wavelength conversion member according to the present disclosure includes: a quantum dot phosphor; a white pigment including an organic substance layer containing an organic substance on at least a part of the surface thereof; and a resin cured product including the quantum dot phosphor and the white pigment. If necessary, the wavelength conversion member may further include any other component such as a coating material described later.

The resin cured product may be a cured product (a resin cured product for wavelength conversion) of a resin composition for wavelength conversion according to the present disclosure described later.

The white pigment to be included in the wavelength conversion member according to present disclosure has an organic substance layer containing an organic substance on at least a part of the surface thereof. The presence of the organic substance on the surface of the white pigment improves affinity between the white pigment and the resin cured product, and thus, the aggregation of the white pigment in the resin cured product is suppressed. As a result, it is assumed that the scattering efficiency of the white pigment for scattering incident light incident on the wavelength conversion member is improved, allowing the wavelength conversion member to have a superior emission intensity.

The wavelength conversion member according to present disclosure is suitably used for displaying an image.

The resin cured product to be included in the wavelength conversion member is not particularly limited, as long as the wavelength conversion member includes a quantum dot phosphor and a white pigment. The resin cured product may contain an alicyclic structure and a sulfide structure.

In a case in which a resin cured product contains an alicyclic structure and a sulfide structure, the resin cured product containing an alicyclic structure and a sulfide structure may be a resin cured product formed by, for example, a polymerization reaction between a thiol group in a compound containing a thiol group and a carbon-carbon double bond in a compound containing a carbon-carbon double bond. The alicyclic structure contained in the resin cured product may be derived from a structure contained in a compound containing a carbon-carbon double bond.

In a case in which the resin cured product contains an alicyclic structure and a sulfide structure, the alicyclic structure contained in the resin cured product is not particularly limited. Specific examples of the alicyclic structure include: a tricyclodecane skeleton, a cyclohexane skeleton, a 1,3-adamantane skeleton, a hydrogenated bisphenol A skeleton, a hydrogenated bisphenol F skeleton, a hydrogenated bisphenol S skeleton, and an isobornyl skeleton. Among these, the alicyclic structure is preferably a tricyclodecane skeleton or an isobornyl skeleton, and more preferably a tricyclodecane skeleton.

The resin cured product may contain one alicyclic structure singly, or at least two alicyclic structures. It is preferable that the resin cured product contains at least two alicyclic structures.

In a case in which the resin cured product contains at least two alicyclic structures, examples of the combination of the alicyclic structures include a combination of a tricyclodecane skeleton and an isobornyl skeleton, and a combination of a hydrogenated bisphenol A skeleton and an isobornyl skeleton. Among these, a combination of a tricyclodecane skeleton and an isobornyl skeleton is preferred.

The ratio (V1/V2) of a peak area (V1) attributed to S—H stretching vibration to a peak area (V2) attributed to C—H stretching vibration, in the resin cured product, as measured using a Fourier transformation infrared spectrophotometer, is preferably 0.005 or less, more preferably 0.004 or less, and still more preferably 0.002 or less.

In a case in which the resin cured product is formed by a polymerization reaction between a thiol group in a compound containing a thiol group and a carbon-carbon double bond in a compound containing a carbon-carbon double bond, a smaller value of the ratio (V1/V2) suggests, namely, that there is a smaller number of thiol groups not contributing to the polymerization reaction. In a case in which the number of thiol groups not contributing to the polymerization reaction is smaller, the resin cured product tends to have a higher glass transition temperature.

The peak area (V1) attributed to S—H stretching vibration and the peak area (V2) attributed to C—H stretching vibration, in the resin cured product, refer to the values measured using a Fourier transformation infrared spectrophotometer, by the following method.

The surface of a wavelength conversion member to be measured is analyzed by ATR (Attenuated Total Reflection (total reflection measurement method)), using an FT-IR Spectrometer (manufactured by PerkinElmer). A background measurement is carried out by measuring air, and FT-IR measurement was carried out under conditions of a cumulative number of 16 times. In a case in which the wavelength conversion member includes a coating material, a cured product layer of the wavelength conversion member in a state where the coating material has been peeled off is subjected to the FT-IR measurement.

The resin cured product may contain an ester structure. Examples of the compound containing a carbon-carbon double bond, as a material for the resin cured product, include a (meth)allyl compound containing a (meth)allyl group and a (meth)acrylate compound containing a (meth)acryloyl group. A (meth)acrylate compound tends to have a higher activity in a polymerization reaction, as compared to a (meth)allyl compound. The fact that the resin cured product contains an ester structure suggests, namely, that a (meth)acrylate compound was used as the compound containing a carbon-carbon double bond. A resin cured product formed using a (meth)acrylate compound tends to have a higher glass transition temperature, as compared to a resin cured product formed using a (meth)allyl compound.

(White Pigment)

The resin cured product includes a white pigment.

Specific examples of the white pigment include titanium oxide, barium sulfate, zinc oxide, and calcium carbonate. Among these, the white pigment is preferably titanium oxide, from the viewpoint of improving light scattering efficiency.

In a case in which the resin cured product contains titanium oxide as the white pigment, the titanium oxide may be a rutile-type titanium oxide or an anatase-type titanium oxide, and is preferably a rutile-type titanium oxide.

The white pigment preferably has an average particle diameter of from 0.1 μm to 1 μm, more preferably from 0.2 μm to 0.8 μm, and still more preferably from 0.2 μm to 0.5 μm.

The average particle diameter of the white pigment is obtained by observing the particles of the pigment using a scanning electron microscope, calculating a circle equivalent diameter (geometric mean of a longer diameter and a shorter diameter) for 50 particles, and determining an arithmetic mean value of the calculated diameters, as the average particle size.

The average particle diameter of the white pigment contained in the resin composition for wavelength conversion is measured as follows.

The white pigment extracted from the resin composition for wavelength conversion is dispersed in purified water containing a surfactant, to obtain a dispersion liquid. The dispersion liquid is subjected to a volume-based particle size distribution measurement using a laser diffraction particle size distribution measuring apparatus (for example, SALD-3000J, manufactured by Shimadzu Corporation), and the value (median size (D50)) of the particle diameter at which accumulation from a smaller diameter side reaches 50% is defined as the average particle diameter of the white pigment. The white pigment may be extracted from the resin composition for wavelength conversion, for example, by a method in which the resin composition for wavelength conversion is diluted with a liquid medium, and the white pigment is precipitated by centrifugation or the like, followed by separating and collecting the pigment.

The white pigment has an organic substance layer that include an organic substance, on at least a part of the surface of the white pigment. Examples of the organic substance to be contained in the organic substance layer include an organic silane, an organosiloxane, a fluorosilane, an organic phosphonate, an organic phosphoric acid compound, an organic phosphinate, an organic sulfonic acid compound, a carboxylic acid, a carboxylic acid ester, a carboxylic acid derivative, an amide, a hydrocarbon wax, a polyolefin, a polyolefin copolymer, a polyol, a polyol derivative, an alkanolamine, an alkanolamine derivative, and an organic dispersant.

The organic substance to be contained in the organic substance layer preferably contains a polyol, an organic silane, or the like, and more preferably contains at least one of a polyol or an organic silane.

Specific examples of the organic silane include octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, and octadecyltriethoxysilane.

Specific examples of the organosiloxane include polydimethylsiloxane (PDMS) terminated with a trimethylsilyl functional group, polymethylhydrosiloxane (PMHS), and a polysiloxane derived from PMHS by functionalization (by hydrosilylation) of PMHS with an olefin.

Specific examples of the organic phosphonate include: n-octylphosphonic acid and esters thereof; n-decylphosphonic acid and esters thereof; 2-ethylhexylphosphonic acid and esters thereof; and camphylphosphonic acid and esters thereof.

Specific examples of the organic phosphoric acid compound include: organic acidic phosphates, organic pyrophosphates, organic polyphosphates, and organic metaphosphates; and salts thereof.

Specific examples of the organic phosphinate include n-hexylphosphinic acid and esters thereof; n-octylphosphinic acid and esters thereof; di-n-hexylphosphinic acid and esters thereof; and di-n-octylphosphinic acid and esters thereof.

Specific examples of the organic sulfonic acid compound include: alkyl sulfonic acids such as hexylsulfonic acid, octylsulfonic acid, or 2-ethylhexylsulfonic acid; and salts of these alkyl sulfonic acids with metallic ions such as a sodium, calcium, magnesium, aluminum or titanium ion, or with an organic ammonium ion such as an ammonium ion and triethanolamine.

Specific examples of the carboxylic acid include maleic acid, malonic acid, fumaric acid, benzoic acid, phthalic acid, stearic acid, oleic acid, and linoleic acid.

Specific examples of the carboxylic acid ester include esters and partial esters produced by the reaction of any of the above-described carboxylic acids with a hydroxy compound such as ethylene glycol, propylene glycol, trimethylolpropane, diethanolamine, triethanolamine, glycerol, hexanetriol, erythritol, mannitol, sorbitol, pentaerythritol, bisphenol A, hydroquinone, or phloroglucinol.

Specific examples of the amide include stearic acid amide, oleic acid amide, and erucic acid amide.

Specific examples of the polyolefin and the polyolefin copolymer include polyethylene, polypropylene or ethylene and copolymers thereof with one or two or more compounds selected from the group consisting of propylene, butylene, vinyl acetate, acrylate, acrylamide, and the like.

Specific examples of the polyol include glycerol, trimethylolethane, and trimethylolpropane.

Specific examples of the alkanolamine include diethanolamine and triethanolamine.

Specific examples of the organic dispersant include citric acid, polyacrylic acid, polymethacrylic acid, and polymeric organic dispersants having a functional group such as an anionic functional group, a cationic functional group, a zwitterionic functional group, or a non-ionic functional group.

The white pigment may have a metal oxide layer that includes a metal oxide, on at least a part of the surface of the white pigment. Examples of the metal oxide to be contained in the metal oxide layer include silicon dioxide, aluminum oxide, zirconia, phosphoria, and boria. The metal oxide layer may be composed of one layer, or may be composed of two or more layers. In a case in which the white pigment has a metal oxide layer composed of two layers, the metal oxide layer preferably includes a first metal oxide layer containing silicon dioxide and a second metal oxide layer containing aluminum oxide.

In a case in which the white pigment has the metal oxide layer, dispersibility of the white pigment in the resin cured product containing an alicyclic structure and a sulfide structure tends to improve.

The white pigment may have the organic substance layer and the metal oxide layer. In this case, it is preferred that the metal oxide layer and the organic substance layer are provided in this order on the surface of the white pigment. In a case in which the white pigment has the organic substance layer and the metal oxide layer composed of two layers, it is preferred that a first metal oxide layer containing silicon dioxide, a second metal oxide layer containing aluminum oxide, and the organic substance layer are provided in this order on the surface of the white pigment.

The content of the white pigment in the resin cured product is, for example, preferably from 0.1% by mass to 2.0% by mass, more preferably from 0.2% by mass to 2.0% by mass, still more preferably from 0.2% by mass to 1.5% by mass, particularly preferably from 0.3% by mass to 1.5% by mass, and extremely preferably from 0.4% by mass to 1.5% by mass, with respect to the total amount of the resin cured product.

In the resin cured product, it is preferred that at least a part of the white pigments is present as primary particles. When at least a part of the white pigments is present as primary particles, the scattering efficiency of the white pigment for scattering the incident light incident on the wavelength conversion member tends to be further improved.

Whether or not at least a part of the white pigments is present as primary particles in the resin cured product, can be confirmed by observation using an electron microscope.

The content of an inorganic substance(s) other than the white pigment and the quantum dot phosphor is preferably 0.5% by mass or less, more preferably 0.3% by mass or less, and still more preferably 0.1% by mass or less, with respect to the total amount of resin cured product. When the content of the inorganic substance(s) is 0.5% by mass or less, a decrease in the scattering efficiency of the white pigment for scattering the incident light and a decrease in luminous efficiency of the quantum dot phosphor tend to be suppressed.

(Quantum Dot Phosphor)

The resin cured product includes a quantum dot phosphor. The quantum dot phosphor is not particularly limited, and examples thereof include particles containing at least one selected from the group consisting of a compound of Group II-VI, a compound of Group III-V, a compound of Group IV-VI, and a compound of Group IV. From the viewpoint of improving the luminous efficiency, the quantum dot phosphor preferably contains a compound containing at least one of Cd or In.

Specific examples of the compound of Group II-VI include CdSe, CdTe, CdS, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, and HgZnSTe.

Specific examples of the compound of Group III-V include GaN, GaP, GaAs, GaSb, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, and InAlPSb.

Specific examples of the compound of Group IV-VI include SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, and SnPbSTe.

Specific examples of the compound of Group IV include Si, Ge, SiC, and SiGe.

The quantum dot phosphor is preferably one having a core-shell structure. By allowing a compound forming the shell to have a wider band gap than the band gap of a compound forming the core, it is possible to further improve quantum efficiency of the quantum dot phosphor. Examples of the combination of the core and the shell (core/shell) include CdSe/ZnS, InP/ZnS, PbSe/PbS, CdSe/CdS, CdTe/CdS, and CdTe/ZnS.

Further, the quantum dot phosphor may have a so-called core/multi-shell structure, in which the shell has a multi-layer structure. The quantum efficiency of the quantum dot phosphor can further be improved, by layering one layer or two or more layers of a shell having a narrower band gap, on a core having a wider band gap, and then further layering on this shell, a shell having a wider band gap.

The resin cured product may include one quantum dot phosphor singly, or may include a combination of two or more quantum dot phosphors. Examples of embodiments in which the resin cured product include a combination of two or more quantum dot phosphors include: an embodiment in which the resin cured product include two or more quantum dot phosphors which are made of different components but have the same average particle size; an embodiment in which the resin cured product include two or more quantum dot phosphors which have different average particle sizes but are made of the same component(s); and an embodiment in which the resin cured product include two or more quantum dot phosphors which are made of different components and have different average particle sizes. By changing at least one of the component(s) or the average particle size of a quantum dot phosphor, it is possible to change a center emission wavelength of the quantum dot phosphor.

For example, the resin cured product may include a quantum dot phosphor G having a center emission wavelength within a green wavelength range of from 520 nm to 560 nm, and a quantum dot phosphor R having a center emission wavelength within a red wavelength range of from 600 nm to 680 nm. When an exciting light having a blue wavelength of from 430 nm to 480 nm is irradiated to a wavelength conversion member including a resin cured product including the quantum dot phosphor G and the quantum dot phosphor R, green light and red light are emitted from the quantum dot phosphor G and the quantum dot phosphor R, respectively. As a result, white light can be obtained by the combination of the green light and the red light emitted respectively from the quantum dot phosphor G and the quantum dot phosphor R as well as the blue light transmitted through the cured product.

Further, the content of the quantum dot phosphor in the resin cured product is, for example, preferably from 0.01% by mass to 1.0% by mass, more preferably from 0.05% by mass to 0.5% by mass, and still more preferably from 0.1% by mass to 0.5% by mass, with respect to the total amount of the resin cured product. When the content of the quantum dot phosphor is 0.01% by mass or more, a satisfactory emission intensity tends to be obtained upon irradiating an exciting light to the wavelength conversion member. When the content of the quantum dot phosphor is 1.0% by mass or less, the aggregation of the quantum dot phosphor in the resin cured product tends to be suppressed.

The shape of the wavelength conversion member is not particularly limited, and the wavelength conversion member may be in the form of a film, a lens or the like. In a case in which the wavelength conversion member is used in a back light unit described later, the wavelength conversion member is preferably in the form of a film.

In a case in which the wavelength conversion member is in the form of a film, the wavelength conversion member has an average thickness of, for example, preferably from 50 μm to 200 μm, more preferably from 50 μm to 150 μm, and still more preferably from 80 μm to 120 μm. When the wavelength conversion member has an average thickness of 50 μm or more, wavelength conversion efficiency tends to be further improved. When the wavelength conversion member has an average thickness of 200 μm or less, and in a case in which the wavelength conversion member is used in the back light unit to be described later, there is a tendency that the thickness of the back light unit can be reduced.

The average thickness of the wavelength conversion member in the form of a film is determined, for example, by measuring the thickness of the member at arbitrarily selected three points using a micrometer, and calculating the arithmetic mean value of the measured thicknesses, as the average thickness.

The wavelength conversion member may be formed by curing one kind of resin composition for wavelength conversion, or may be formed by curing two or more kinds of resin compositions for wavelength conversion. For example, in a case in which the wavelength conversion member is in the form of a film, the wavelength conversion member may be one in which a first cured product layer obtained by curing a resin composition for wavelength conversion containing a first quantum dot phosphor, and a second cured product layer obtained by curing a resin composition for wavelength conversion containing a second quantum dot phosphor whose luminescence properties are different from those of the first quantum dot phosphor, are disposed one on another in layers.

The wavelength conversion member may be obtained by forming a coating film, a molded product or the like of the resin composition for wavelength conversion, and performing a drying treatment, if necessary, followed by irradiation of an active energy ray such as UV light. The wavelength and irradiation dose of the active energy ray can be set as appropriate, depending on the formulation of the resin composition for wavelength conversion to be used. In one embodiment, UV light having a wavelength of from 280 nm to 400 nm is irradiated at an irradiation dose of from 100 mJ/cm$^2$ to 5,000 mJ/cm$^2$. Examples of a UV light source to be used include a low pressure mercury lamp, a medium pressure mercury lamp, a high pressure mercury lamp, an ultra-high pressure mercury lamp, a carbon arc lamp, a metal halide lamp, a xenon lamp, a chemical lamp, a black light lamp, and a microwave-excited mercury lamp.

The resin cured product has a loss tangent (tan δ), as measured by dynamic viscoelasticity measurement under the conditions of a frequency of 10 Hz and a temperature of 25° C., of preferably from 0.4 to 1.5, more preferably from 0.4 to 1.2, and still more preferably from 0.4 to 0.6, from the viewpoint of further improving adhesion. The loss tangent (tan δ) of the resin cured product can be measured using a dynamic viscoelasticity measuring apparatus (for example, Solid Analyzer, RSA-III, manufactured by Rheometric Scientific Inc.).

Further, the resin cured product has a glass transition temperature (Tg) of preferably 85° C. or higher, more preferably from 85° C. to 160° C., and still more preferably from 90° C. to 120° C., from the viewpoint of further improving the adhesion, heat resistant, and resistance to moist heat. The glass transition temperature (Tg) of the resin cured product can be measured using a dynamic viscoelasticity measuring apparatus (for example, Solid Analyzer, RSA-III, manufactured by Rheometric Scientific Inc.), at a frequency of 10 Hz.

Further, the resin cured product has a storage modulus, as measured under the conditions of a frequency of 10 Hz and a temperature of 25° C., of preferably from $1\times10^7$ Pa to $1\times10^{10}$ Pa, more preferably from $5\times10^7$ Pa to $1\times10^{10}$ Pa, and still more from $5\times10^7$ Pa to $5\times10^9$ Pa, from the viewpoint of further improving the adhesion, heat resistant, and resistance to moist heat. The storage modulus of the resin cured product can be measured using a dynamic viscoelasticity measuring apparatus (for example, Solid Analyzer, RSA-III, manufactured by Rheometric Scientific Inc.).

The wavelength conversion member according to present disclosure may include a coating material that coats at least a part of the resin cured product. For example, in a case in which the resin cured product is in the form of a film, one surface or both surfaces of the film-shaped resin cured product may be coated by a coating material(s) in the form of a film.

The coating material preferably has a barrier property against at least one of oxygen or water, and more preferably has a barrier property against both oxygen and water, from the viewpoint of suppressing a decrease in the luminous efficiency of the quantum dot phosphor. The coating material having a barrier property against at least one of oxygen or water is not particularly limited, and it is possible to use a known coating material, such as a barrier film having an inorganic substance layer.

In a case in which the coating material is in the form of a film, the coating material has an average thickness of, for example, preferably from 100 μm to 150 μm, more preferably from 100 μm to 140 μm, and still more preferably from 100 μm to 135 μm. When the average thickness is 100 μm or more, the coating material tends to have a satisfactory function such as barrier property. When the average thickness is 150 μm or less, a decrease in light transmittance tends to be suppressed.

The average thickness of the coating material in the form of a film is determined in the same manner as that for the wavelength conversion member.

The coating material has an oxygen permeability of, for example, preferably from 0.5 mL/(m$^2$·24 h·atm) or less, more preferably from 0.3 mL/(m$^2$·24 h·atm) or less, and still more preferably from 0.1 mL/(m$^2$·24 h·atm) or less. The oxygen permeability of the coating material can be measured using an oxygen permeability measuring apparatus (for example, OX-TRAN, manufactured by MOCON Inc.), under the conditions of a temperature of 23° C. and a relative humidity of 65%.

Further, the coating material has a water vapor permeability of, for example, preferably $5\times10^{-2}$ g/(m$^2$·24 h·Pa) or less, more preferably $1\times10^{-2}$ g/(m$^2$·24 h·Pa) or less, and still more preferably $5\times10^{-3}$ g/(m$^2$·24 h·Pa) or less. The water vapor permeability of the coating material can be measured using a water vapor permeability measuring apparatus (for example, AQUATRAN, manufactured by MOCON Inc.) under the conditions of a temperature of 40° C. and a relative humidity of 90%.

From the viewpoint of further improving the utilization efficiency of light, the wavelength conversion member according to present disclosure has a total light transmittance of preferably 55% or more, more preferably 60% or more, and still more preferably 65% or more. The total light transmittance of the wavelength conversion member can be measured in accordance with the method described in JIS K 7136: 2000.

Further, the wavelength conversion member according to present disclosure has a haze of preferably 95% or more, more preferably 97% or more, and still more preferably 99% or more, from the viewpoint of further improving the utilization efficiency of light. The haze of the wavelength conversion member can be measured in accordance with the method described in JIS K 7136: 2000.

FIG. 1 shows one example of a schematic configuration of the wavelength conversion member. It is noted, however, that the wavelength conversion member according to present disclosure is not particularly limited the configuration shown in FIG. 1. Further, the sizes of the cured product layer and the coating materials shown in FIG. 1 are merely schematic, and the relative relationship between the respective sizes are not limited thereto. In each of the drawings, the same reference numerals denote the same members, and duplicate descriptions may be omitted.

A wavelength conversion member 10 shown in FIG. 1 includes: a cured product layer 11, which is a resin cured product in the form of a film; and a coating material 12A and a coating material 12B, which are provided on respective surfaces of the cured product layer 11 and are each in the form of a film. The types and the average thicknesses of the coating material 12A and the coating material 12B may be the same as, or different from, each other.

The wavelength conversion member having the configuration shown in FIG. 1 can be produced, for example, by a known production method such as one described below.

First, the resin composition for wavelength conversion described later is applied on a surface of a film-shaped coating material (hereinafter, also referred to as a "first coating material") which is continuously transported, to form a coating film. The method of applying the resin composition for wavelength conversion is not particularly limited, and examples thereof include a die coating method, a curtain coating method, an extrusion coating method, a rod coating method, and a roll coating method.

Subsequently, a film-shaped coating material (hereinafter, also referred to as a "second coating material") which is continuously transported is pasted on the thus-formed coating film of the resin composition for wavelength conversion.

Thereafter, an active energy ray is irradiated from the side of either the first coating material or the second coating material that is capable of transmitting the active energy ray, to cure the coating film and to thereby form a cured product layer. The resultant is then cut into a prescribed size. In this manner, the wavelength conversion member having the configuration shown in FIG. 1 can be obtained.

In a case in which both the first coating material and the second coating material are not capable of transmitting an active energy ray, the cured product layer may be formed by irradiating the active energy ray to the coating film before pasting the second coating material thereon.

<Back Light Unit>

A back light unit according to the present disclosure includes: the above-described wavelength conversion member according to present disclosure; and a light source.

The back light unit is preferably one that includes a multiple wavelength light source, from the viewpoint of improving color reproducibility. One preferred embodiment may be, for example, a back light unit which emits: blue light having a center emission wavelength within a wavelength range of from 430 nm to 480 nm, and an emission intensity peak whose full width at half maximum is 100 nm or less; green light having a center emission wavelength within a wavelength range of from 520 nm to 560 nm, and an emission intensity peak whose full width at half maximum is 100 nm or less; and red light having a center emission wavelength within a wavelength range of from 600 nm to 680 nm, and an emission intensity peak whose full width at half maximum is 100 nm or less. The full width at half maximum of an emission intensity peak refers to the width of the peak at a height corresponding to ½ of the height of the peak.

From the viewpoint of further improving the color reproducibility, the center emission wavelength of the blue light emitted from the back light unit is preferably within a range of from 440 nm to 475 nm. From the same viewpoint, the center emission wavelength of the green light emitted from the back light unit is preferably within a range of from 520 nm to 545 nm. Further, from the same viewpoint, the center emission wavelength of the red light emitted from the back light unit is preferably within a range of from 610 nm to 640 nm.

Further, the full width at half maximum of each of the emission intensity peaks of the blue light, green light, and red light emitted from the back light unit is preferably 80 nm or less, more preferably 50 nm or less, still more preferably 40 nm or less, particularly preferably 30 nm or less, and extremely preferably 25 nm or less, from the viewpoint of further improving the color reproducibility.

As the light source to be included in the back light unit, it is possible to use, for example, a light source which emits blue light having a center emission wavelength within a wavelength range 430 nm to 480 nm. Examples of the light source include an LED (Light Emitting Diode) and a laser. In the case of using a light source which emits blue light, it is preferred that the wavelength conversion member at least includes the quantum dot phosphor R which emits red light and the quantum dot phosphor G which emits green light. By this arrangement, white light can be obtained by the combination of the red light and green light emitted from the wavelength conversion member as well as the blue light transmitted through the wavelength conversion member.

Further, as the light source to be included in the back light unit, it is possible to use, for example, a light source which emits UV light having a center emission wavelength within a wavelength range of from 300 nm to 430 nm. Examples of the light source include an LED and a laser. In the case of using a light source which emits UV light, it is preferred that the wavelength conversion member includes, along with the quantum dot phosphor R and the quantum dot phosphor G, a quantum dot phosphor B that is excited by an exciting light and emits blue light. By this arrangement, white light can be obtained by the combination of the red light, the green light, and the blue light emitted from the wavelength conversion member.

The back light unit according to the present disclosure may be a back light unit employing an edge-light system or a direct system.

Figure 2:
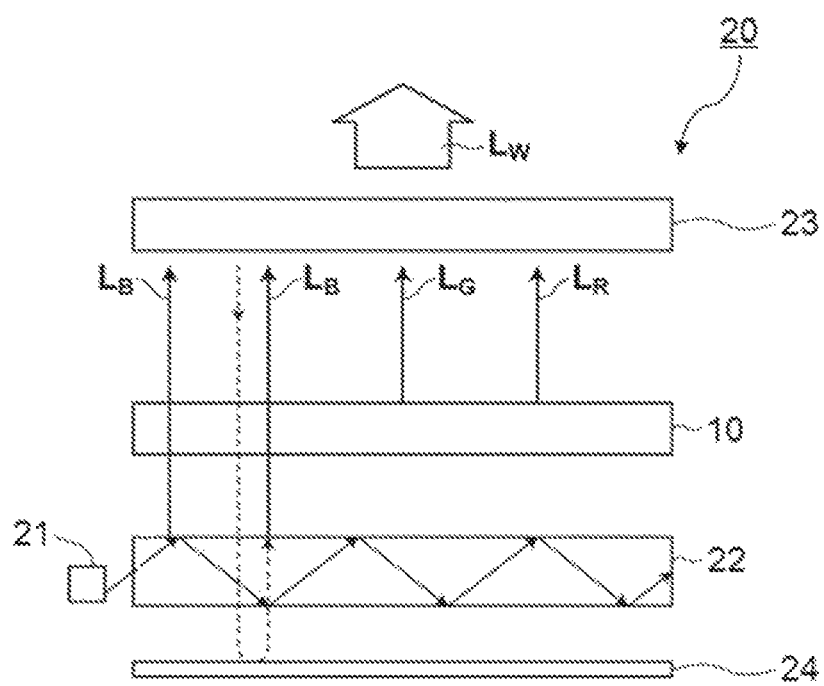
FIG. 2 is a diagram showing one example of a schematic configuration of a back light unit.

FIG. 2 shows one example of a schematic configuration of the back light unit employing an edge-light system. It is noted, however, that the back light unit according to the present disclosure is not particularly limited to the configuration shown in FIG. 2. Further, the sizes of the members shown in FIG. 2 are merely schematic, and the relative relationship between the sizes of the members are not limited thereto.

A back light unit 20 shown in FIG. 2 includes: a light source 21 which emits blue light LB; a light guide plate 22 which guides the blue light LB emitted from the light source 21 and allows the blue light LB to be emitted from the light guide plate 22; the wavelength conversion member 10 disposed so as to face the light guide plate 22; a retroreflective member 23 disposed so as to face the light guide plate 22 with the wavelength conversion member 10 interposed therebetween; and a reflector plate 24 disposed so as to face the wavelength conversion member 10 with the light guide plate 22 interposed therebetween. The wavelength conversion member 10 emits red light LR and green light LG by using a part of the blue light LB as the exciting light, and thus emits the red light LR and the green light LG, as well as the blue light LB which has not been used as the exciting light. The combination of the above described red light LR, green light LG, and blue light LB allow white light Lw to be emitted from the retroreflective member 23.

<Image Display Device>

An image display device according to the present disclosure includes the above-described back light unit according to the present disclosure. The image display device is not particularly limited, and examples thereof include a liquid crystal display device.

Figure 3:
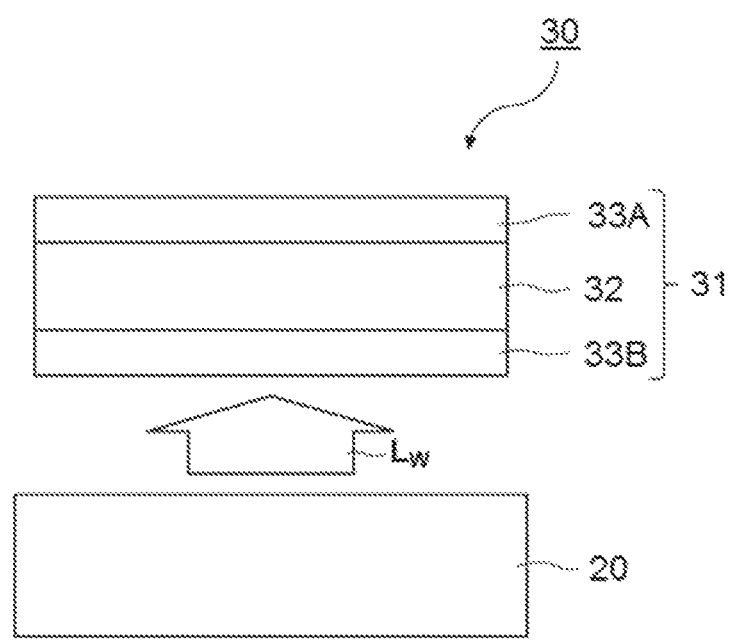
FIG. 3 is a diagram showing one example of a schematic configuration of a liquid crystal display device.

FIG. 3 shows one example of a schematic configuration of the liquid crystal display device. It is noted, however, that the liquid crystal display device according to the present disclosure is not particularly limited to the configuration shown in FIG. 3. Further, the sizes of the members shown in FIG. 3 are merely schematic, and the relative relationship between the sizes of the members are not limited thereto.

A liquid crystal display device 30 shown in FIG. 3 includes: the back light unit 20; and a liquid crystal cell unit 31 disposed so as to face the back light unit 20. The liquid crystal cell unit 31 has a configuration in which a liquid crystal cell 32 is disposed between a polarizing plate 33A and a polarizing plate 33B.

A drive system of the liquid crystal cell 32 is not particularly limited, and examples thereof include a TN (Twisted Nematic) system, an STN (Super Twisted Nematic) system, a VA (Vertical Alignment) system, an IPS (In-Plane-Switching) system, and an OCB (Optically Compensated Birefringence) system.

<Resin Composition for Wavelength Conversion>

The resin composition for wavelength conversion according to the present disclosure contains: a quantum dot phosphor; and a white pigment having an organic substance layer that contains an organic substance, on at least a part of the surface of the white pigment. The resin composition for wavelength conversion may further contain a polyfunctional (meth)acrylate compound, a polyfunctional thiol compound, and a photopolymerization initiator.

The white pigment contained in the resin composition for wavelength conversion according to the present disclosure has an organic substance layer that contains an organic substance, on at least a part of the surface of the white pigment. The presence of the organic substance on the surface of the white pigment improves affinity between the white pigment and other components other than the white pigment contained in the resin composition for wavelength conversion, and thus improves the dispersibility of the white pigment in the resin composition for wavelength conversion. As a result, it is assumed that the aggregation or precipitation of the white pigment can be suppressed.

Components contained in the resin composition for wavelength conversion according to the present disclosure will now be described in detail.

(Quantum Dot Phosphor)

The resin composition for wavelength conversion contains a quantum dot phosphor. The details of the quantum dot phosphor are as described in the section of the wavelength conversion member.

The quantum dot phosphor may be used in a state of a quantum dot phosphor dispersion liquid obtained by dispersing the quantum dot phosphor in a dispersion medium. Examples of the dispersion medium for dispersing the quantum dot phosphor include various types of organic solvents and monofunctional (meth)acrylate compounds. In a case in which the quantum dot phosphor is used as a quantum dot phosphor dispersion liquid, a dispersant may be used if necessary.

Examples of the organic solvent usable as the dispersion medium include water, acetone, ethyl acetate, toluene, and n-hexane.

The monofunctional (meth)acrylate compound usable as the dispersion medium is not particularly limited, as long as the compound is in the form of a liquid at room temperature (25° C.), and examples thereof include isobornyl (meth)acrylate and dicyclopentanyl (meth)acrylate.

Among these, the dispersion medium is preferably a monofunctional (meth)acrylate compound, more preferably a monofunctional (meth)acrylate compound having an alicyclic structure, still more preferably isobornyl (meth)acrylate or dicyclopentanyl (meth)acrylate, and particularly preferably isobornyl (meth)acrylate, because the use of such a compound eliminates the need for carrying out a step of volatilizing the dispersion medium when curing the resin composition for wavelength conversion.

In a case in which a monofunctional (meth)acrylate compound is used as the dispersion medium, a content ratio (monofunctional (meth)acrylate compound/polyfunctional (meth)acrylate compound) of the monofunctional (meth)acrylate compound to the polyfunctional (meth)acrylate compound, in mass basis, is preferably from 0.01 to 0.30, more preferably from 0.02 to 0.20, and still more preferably from 0.05 to 0.20.

The proportion of the quantum dot phosphor in the quantum dot phosphor dispersion liquid, in mass basis, is preferably from 1% by mass to 20% by mass, and more preferably from 1% by mass to 10% by mass.

In a case in which the proportion of the quantum dot phosphor in the quantum dot phosphor dispersion liquid, in mass basis, is from 1% by mass to 10% by mass, the content of the quantum dot phosphor dispersion liquid in the resin composition for wavelength conversion is, for example, preferably from 1% by mass to 10% by mass, more preferably from 4% by mass to 10% by mass, and still more preferably from 4% by mass to 7% by mass, with respect to the total amount of the resin composition for wavelength conversion.

Further, the content of the quantum dot phosphor in the resin composition for wavelength conversion is, for example, preferably from 0.01% by mass to 1.0% by mass, more preferably from 0.05% by mass to 0.5% by mass, and still more preferably from 0.1% by mass to 0.5% by mass, with respect to the total amount of the resin composition for wavelength conversion. When the content of the quantum dot phosphor is 0.01% by mass or more, a satisfactory emission intensity tends to be obtained upon irradiating an exciting light to the resulting cured product. When the content of the quantum dot phosphor is 1.0% by mass or less, the aggregation of the quantum dot phosphor tends to be suppressed.

(White Pigment)

The resin composition for wavelength conversion contains a white pigment having an organic substance layer that contains an organic substance, on at least a part of the surface of the white pigment. The details of the white pigment are as described in the section of the wavelength conversion member.

The content of the white pigment in the resin composition for wavelength conversion is, for example, preferably from 0.1% by mass to 2.0% by mass, more preferably from 0.2% by mass to 2.0% by mass, still more preferably from 0.2% by mass to 1.5% by mass, particularly preferably from 0.3% by mass to 1.5% by mass, and extremely preferably from 0.4% by mass to 1.5% by mass, with respect to the total amount of the resin composition for wavelength conversion.

In the resin composition for wavelength conversion, it is preferred that at least a part of the white pigments is present as primary particles. When at least a part of the white pigments is present as primary particles, there is a tendency that at least a part of the white pigments is more likely to be present as primary particles in the resulting resin cured product. As a result, the scattering efficiency of the white pigment for scattering the incident light incident on the wavelength conversion member tends to be further improved.

Whether or not at least a part of the white pigments is present as primary particles in the resin composition for wavelength conversion, can be confirmed by observation using an electron microscope.

In the resin composition for wavelength conversion, the content of an inorganic substance(s) other than the white pigment and the quantum dot phosphor is preferably 0.5% by mass or less, more preferably 0.2% by mass or less, and still more preferably 0.1% by mass or less. When the content of the inorganic substance(s) is 0.5% by mass or less, a decrease in the scattering efficiency of the white pigment for scattering the incident light and a decrease in the luminous efficiency of the quantum dot phosphor tend to be suppressed, in the resin cured product for wavelength conversion formed from the resin composition for wavelength conversion.

(Polyfunctional (Meth)Acrylate Compound)

The resin composition for wavelength conversion according to the present disclosure may contain a polyfunctional (meth)acrylate compound. The polyfunctional (meth)acrylate compound is not particularly limited, and the resin composition for wavelength conversion preferably contains a polyfunctional (meth)acrylate compound having an alicyclic structure, from the viewpoint of improving the resistance to moist heat of the resulting resin cured product.

The polyfunctional (meth)acrylate compound having an alicyclic structure is a polyfunctional (meth)acrylate compound having an alicyclic structure in the skeleton thereof, and having two or more (meth)acryloyl groups within one molecule. Specific examples thereof include alicyclic (meth) acrylates such as tricyclodecane dimethanol di(meth)acrylate, cyclohexane dimethanol di(meth)acrylate, 1,3-adamantane dimethanol di(meth)acrylate, hydrogenated bisphenol A (poly)ethoxy di(meth)acrylate, hydrogenated bisphenol A (poly)propoxy di(meth)acrylate, hydrogenated bisphenol F (poly)ethoxy di(meth)acrylate, hydrogenated bisphenol F (poly)propoxy di(meth)acrylate, hydrogenated bisphenol S (poly)ethoxy di(meth)acrylate, or hydrogenated bisphenol S (poly)propoxy di(meth)acrylate.

From the viewpoint of further improving the resistance to moist heat of the resin composition for wavelength conversion, the alicyclic structure contained in the polyfunctional (meth)acrylate compound having an alicyclic structure preferably contains a tricyclodecane skeleton. The polyfunctional (meth)acrylate compound whose alicyclic structure contains a tricyclodecane skeleton is preferably tricyclodecane dimethanol di(meth)acrylate.

The resin composition for wavelength conversion may also contain another polyfunctional (meth)acrylate compound which does not have an alicyclic structure in the skeleton thereof. Specific examples of the other polyfunctional (meth)acrylate compound include diethylene glycol diacrylate, triethylene glycol diacrylate, tetraethylene glycol diacrylate, trimethylolpropane diacrylate, trimethylolpropane triacrylate, 1,4-butanediol diacrylate, 1,6-hexanediol diacrylate, polyethylene glycol diacrylate, polypropylene glycol diacrylate, ditrimethylolpropane tetraacrylate, pentaerythritol triacrylate, pentaerythritol tetraacrylate, dipentaerythritol hexaacrylate, a triacrylate of tris(β-hydroxyethyl)isocyanurate, diethylene glycol dimethacrylate, triethylene glycol dimethacrylate, tetraethylene glycol dimethacrylate, trimethylolpropane dimethacrylate, trimethylolpropane trimethacrylate, 1,4-butanediol dimethacrylate, 1,6-hexanediol dimethacrylate, polyethylene glycol dimethacrylate, polypropylene glycol dimethacrylate, ditrimethylolpropane tetramethacrylate, pentaerythritol trimethacrylate, pentaerythritol tetramethacrylate, dipentaerythritol hexamethacrylate, and a trimethacrylate of tris (β-hydroxyethyl)isocyanurate.

The content of the polyfunctional (meth)acrylate compound in the resin composition for wavelength conversion is, for example, preferably from 60% by mass to 90% by mass, and more preferably from 70% by mass to 85% by mass, with respect to the total amount of the resin composition for wavelength conversion. When the content of the polyfunctional (meth)acrylate compound is within the above described ranges, the resistance to moist heat of the resulting cured product tends to be further improved.

The resin composition for wavelength conversion may contain one polyfunctional (meth)acrylate compound, or a combination of two or more polyfunctional (meth)acrylate compounds.

The proportion of the polyfunctional (meth)acrylate compound having an alicyclic structure with respect to the total amount of the polyfunctional (meth)acrylate compounds, in mass basis, is preferably from 60% by mass to 100% by mass, more preferably from 70% by mass to 100% by mass, and still more preferably from 80% by mass to 100% by mass.

(Thiol Compound)

The resin composition for wavelength conversion may contain a polyfunctional thiol compound. When the resin composition for wavelength conversion contains a polyfunctional thiol compound, an enethiol reaction between the polyfunctional (meth)acrylate compound and the polyfunctional thiol compound is allowed to proceed during the curing of the resin composition for wavelength conversion. As a result, the adhesion of the resulting cured product tends to be further improved. Further, the incorporation of a polyfunctional thiol compound into the resin composition for wavelength conversion tends to further improve the optical properties of the cured product.

Although a composition containing a (meth)allyl compound and a thiol compound may have a poor storage stability in many cases, the resin composition for wavelength conversion according to the present disclosure has an excellent storage stability despite containing a polyfunctional thiol compound. This is assumed to be because the resin composition for wavelength conversion contains a polyfunctional (meth)acrylate compound.

Specific examples of the polyfunctional thiol compound include ethylene glycol bis(3-mercaptopropionate), diethylene glycol bis(3-mercaptopropionate), tetraethylene glycol bis(3-mercaptopropionate), 1,2-propylene glycol bis(3-mercaptopropionate), diethylene glycol bis(3-mercaptobutyrate), 1,4-butanediol bis(3-mercaptopropionate), 1,4-butanediol bis(3-mercaptobutyrate), 1,8-octanediol bis(3-mercaptopropionate), 1,8-octanediol bis(3-mercaptobutyrate), hexandiol bisthioglycolate, trimethylolpropane tris(3-mercaptopropionate), trimethylolpropane tris(3-mercaptobutyrate), trimethylolpropane tris(3-mercaptoisobutyrate), trimethylolpropane tris(2-mercaptoisobutyrate), trimethylolpropane tristhioglycolate, tris-[(3-mercaptopropionyloxy)-ethyl]-isocyanurate, trimethylolethane tris(3-mercaptobutyrate), pentaerythritol tetrakis(3-mercaptopropionate), pentaerythritol tetrakis(3-mercaptobutyrate), pentaerythritol tetrakis(3-mercaptoisobutyrate), pentaerythritol tetrakis(2-mercaptoisobutyrate), dipentaerythritol hexakis(3-mercaptopropionate), dipentaerythritol hexakis(2-mercaptopropionate), dipentaerythritol hexakis(3-mercaptobutyrate), dipentaerythritol hexakis(3-mercaptoisobutyrate), dipentaerythritol hexakis(2-mercaptoisobutyrate), pentaerythritol tetrakisthioglycolate, and dipentaerythritol hexakisthioglycolate.

Further, the polyfunctional thiol compound may be in the form of a thioether oligomer obtained by a reaction with a polyfunctional (meth)acrylate compound, in advance.

The thioether oligomer can be obtained by addition polymerization of a polyfunctional thiol compound and a polyfunctional (meth)acrylate compound in the presence of a polymerization initiator. In a case in which the thioether oligomer is obtained by the addition polymerization, the ratio (number of equivalent of thiol groups/number of equivalent of (meth)acryloyl groups) of the number of equivalent of thiol groups in the polyfunctional thiol compound to the number of equivalent of (meth)acryloyl groups in the polyfunctional (meth)acrylate compound, to be used as raw materials, is, for example, preferably from 3.0 to 3.3, more preferably from 3.0 to 3.2, and still more preferably from 3.05 to 3.15.

The thioether oligomer has a weight average molecular weight of, for example, preferably from 3,000 to 10,000, more preferably from 3,000 to 8,000, and still more preferably from 4,000 to 6,000.

The weight average molecular weight of the thioether oligomer is determined by obtaining a molecular weight distribution using gel permeation chromatography (GPC), and calculating the weight average molecular weight from the molecular weight distribution using a calibration curve of a standard polystyrene.

Further, the thioether oligomer has a thiol equivalent of, for example, preferably from 200 g/eq to 400 g/eq, more preferably from 250 g/eq to 350 g/eq, and still more preferably from 250 g/eq to 270 g/eq.

The thiol equivalent of the thioether oligomer can be measured, for example, by an iodine titration method as described below.

A quantity of 0.2 g of a measurement sample is precisely weighed, and 20 mL of chloroform is added thereto, to prepare a sample solution. A quantity of 0.275 g of a soluble starch is dissolved in 30 g of pure water to prepare a starch indicator. Subsequently, 20 mL of pure water, 10 mL of isopropyl alcohol, and 1 mL of the thus-prepared starch indicator were added to the sample solution, followed by stirring with a stirrer. An iodine solution was added dropwise to the resultant, and a point at which the layer of chloroform turned green was determined as an end point of titration. At this time, the value given by the following equation is defined as the thiol equivalent of the measurement sample.

$$\text{Thiol equivalent (g/eq)} = \text{mass (g) of measurement sample} \times 10,000 / \text{titer (mL) of iodine solution} \times \text{factor of iodine solution}$$

The resin composition for wavelength conversion may contain a monofunctional thiol compound having one thiol group within one molecule.

Specific examples of the monofunctional thiol compound include hexanethiol, 1-heptanethiol, 1-octanethiol, 1-nonanethiol, 1-decanethiol, 3-mercaptopropionic acid, methyl mercaptopropionate, methoxybutyl mercaptopropionate, octyl mercaptopropionate, tridecyl mercaptopropionate, 2-ethylhexyl-3-mercaptopropionate, and n-octyl-3-mercaptopropionate.

It is preferred that the content of the thiol compound (the total content of the polyfunctional thiol compound and the monofunctional thiol compound) in the resin composition for wavelength conversion is, for example, from 5% by mass to 40% by mass, more preferably from 10% by mass to 30% by mass, and still more preferably from 15% by mass to 25% by mass, with respect to the total amount of the resin composition for wavelength conversion. In this case, a denser cross-linked structure tends to be formed in the resulting cured product due to the enethiol reaction with the polyfunctional (meth)acrylate compound, and the resistance to moist heat tends to be further improved.

The proportion of the polyfunctional thiol compound with respect to the total amount of the polyfunctional thiol compound and the monofunctional thiol compound, in mass basis, is preferably from 60% by mass to 100% by mass, more preferably from 70% by mass to 100% by mass, and still more preferably from 80% by mass to 100% by mass.

The content ratio (polyfunctional (meth)acrylate compound/polyfunctional thiol compound) of the polyfunctional (meth)acrylate compound to the polyfunctional thiol compound, in mass basis, is preferably from 0.5 to 10, more preferably from 0.5 to 8.0, and still more preferably from 0.5 to 6.0.

(Photopolymerization Initiator)

The resin composition for wavelength conversion may contain a photopolymerization initiator. The photopolymerization initiator is not particularly limited, and may specifically be, for example a compound that generates a radical by the irradiation of an active energy ray such as UV light.

Specific examples of the photopolymerization initiator include: aromatic ketone compounds such as benzophenone, N,N'-tetraalkyl-4,4'-diaminobenzophenone, 2-benzyl-2-dimethylamino-1-(4-morpholinophenyl)-butanone-1, 2-methyl-1-[4-(methylthio)phenyl]-2-morpholino-propanone-1,4,4'-bis (dimethylamino)benzophenone (also referred to as "Michler's ketone"), 4,4'-bis(diethylamino) benzophenone, 4-methoxy-4'-dimethylaminobenzophenone, 1-hydroxycyclohexyl phenyl ketone, 1-(4-isopropylphenyl)-2-hydroxy-2-methylpropan-1-one, 1-(4-(2-hydroxyethoxy)-phenyl)-2-hydroxy-2-methyl-1-propan-1-one, or 2-hydroxy-2-methyl-1-phenylpropan-1-one; quinone compounds such as alkyl anthraquinones or phenanthrenequinone; benzoin compounds such as benzoin or alkyl benzoins; benzoin ether compounds such as benzoin alkyl ethers or benzoin phenyl ether; benzyl derivatives such as benzyl dimethyl ketal; 2,4,5-triarylimidazole dimers such as a 2-(o-chlorophenyl)-4,5-diphenylimidazole dimer, a 2-(o-chlorophenyl)-4,5-di(m-methoxyphenyl)imidazole dimer, a 2-(o-fluorophenyl)-4,5-diphenylimidazole dimer, a 2-(o-methoxyphenyl)-4,5-diphenylimidazole dimer, a 2,4-di(p-methoxyphenyl)-5-phenylimidazole dimer, or a 2-(2,4-dimethoxyphenyl)-4,5-diphenylimidazole dimer; acridine derivatives such as 9-phenylacridine or 1,7-(9,9'-acridinyl)heptane; oxime ester compounds such as 1,2-octanedione 1-[4-(phenylthio)-2-(O-benzoyloxime)], or ethanone 1-[9-ethyl-6-(2-methylbenzoyl)-9H-carbazol-3-yl]-1-(O-acetyloxime); coumarin compounds such as 7-diethylamino-4-methylcoumarin; thioxanthone compounds such as 2,4-diethylthioxanthone; and acylphosphine oxide compounds such as 2,4,6-trimethylbenzoyl-diphenyl-phosphine oxide, or 2,4,6-trimethylbenzoyl-phenyl-ethoxy-phosphine oxide. The resin composition for wavelength conversion may contain one photopolymerization initiator singly, or a combination of two or more photopolymerization initiators.

From the viewpoint of improving curing property, the photopolymerization initiator is preferably at least one selected from the group consisting of an acylphosphine oxide compound, an aromatic ketone compound, and an oxime ester compound, and more preferably at least one selected from the group consisting of an acylphosphine oxide compound and an aromatic ketone compound, and still more preferably an acylphosphine oxide compound.

The content of the photopolymerization initiator in the resin composition for wavelength conversion is, for example, preferably from 0.1% by mass to 5% by mass, more preferably from 0.1% by mass to 3% by mass, and still more preferably from 0.5% by mass to 1.5% by mass, with respect to the total amount of the resin composition for wavelength conversion. When the content of the photopolymerization initiator is 0.1% by mass or more, the resin composition for wavelength conversion tends to have a satisfactory sensitivity. When the content of the photopolymerization initiator is 5% by mass or less, an impact on the color of the resin composition for wavelength conversion and a decrease in the storage stability tend to be suppressed.

(Liquid Medium)

It is preferred that the resin composition for wavelength conversion contains no liquid medium, or contains a liquid medium in a content of 0.5% by mass or less. The liquid medium refers to a medium which is in the form of a liquid at room temperature (25° C.).

Specific examples of the liquid medium include: ketone solvents such as acetone, methyl ethyl ketone, methyl-n-propyl ketone, methyl isopropyl ketone, methyl-n-butyl ketone, methyl isobutyl ketone, methyl-n-pentyl ketone, methyl-n-hexyl ketone, diethyl ketone, dipropyl ketone, diisobutyl ketone, trimethyl nonanone, cyclohexanone, cyclopentanone, methylcyclohexanone, 2,4-pentanedione, or acetonylacetone; ether solvents such as diethyl ether, methyl ethyl ether, methyl-n-propyl ether, diisopropyl ether, tetrahydrofuran, methyltetrahydrofuran, dioxane, dimethyldioxane, ethylene glycol dimethyl ether, ethylene glycol diethyl ether, ethylene glycol di-n-propyl ether, ethylene glycol di-n-butyl ether, diethylene glycol dimethyl ether, diethylene glycol diethyl ether, diethylene glycol methyl ethyl ether, diethylene glycol methyl-n-propyl ether, diethylene glycol methyl-n-butyl ether, diethylene glycol di-n-propyl ether, diethylene glycol di-n-butyl ether, diethylene glycol methyl-n-hexyl ether, triethylene glycol dimethyl ether, triethylene glycol diethyl ether, triethylene glycol methyl ethyl ether, triethylene glycol methyl-n-butyl ether, triethylene glycol di-n-butyl ether, triethylene glycol methyl-n-hexyl ether, tetraethylene glycol dimethyl ether, tetraethylene glycol diethyl ether, tetraethylene glycol methyl ethyl ether, tetraethylene glycol methyl-n-butyl ether, tetraethylene glycol di-n-butyl ether, tetraethylene glycol methyl-n-hexyl ether, propylene glycol dimethyl ether, propylene glycol diethyl ether, propylene glycol di-n-propyl ether, propylene glycol di-n-butyl ether, dipropylene glycol dimethyl ether, dipropylene glycol diethyl ether, dipropylene glycol methyl ethyl ether, dipropylene glycol methyl-n-butyl ether, dipropylene glycol di-n-propyl ether, dipropylene glycol di-n-butyl ether, dipropylene glycol methyl-n-hexyl ether, tripropylene glycol dimethyl ether, tripropylene glycol diethyl ether, tripropylene glycol methyl ethyl ether, tripropylene glycol methyl-n-butyl ether, tripropylene glycol di-n-butyl ether, tripropylene glycol methyl-n-hexyl ether, tetrapropylene glycol dimethyl ether, tetrapropylene glycol diethyl ether, tetrapropylene glycol methyl ethyl ether, tetrapropylene glycol methyl-n-butyl ether, tetrapropylene glycol di-n-butyl ether, or tetrapropylene glycol methyl-n-hexyl ether; carbonate solvents such as propylene carbonate, ethylene carbonate, or diethyl carbonate; ester solvents such as methyl acetate, ethyl acetate, n-propyl acetate, isopropyl acetate, n-butyl acetate, isobutyl acetate, sec-butyl acetate, n-pentyl acetate, sec-pentyl acetate, 3-methoxybutyl acetate, methylpentyl acetate, 2-ethylbutyl acetate, 2-ethylhexyl acetate, 2-(2-butoxyethoxy)ethyl acetate, benzyl acetate, cyclohexyl acetate, methylcyclohexyl acetate, nonyl acetate, methyl acetoacetate, ethyl acetoacetate, diethylene glycol methyl ether acetate, diethylene glycol monoethyl ether acetate, dipropylene glycol methyl ether acetate, dipropylene glycol ethyl ether acetate, glycol diacetate, methoxy triethylene glycol acetate, ethyl propionate, n-butyl propionate, isoamyl propionate, diethyl oxalate, di-n-butyl oxalate, methyl lactate, ethyl lactate, n-butyl lactate, n-amyl lactate, ethylene glycol methyl ether propionate, ethylene glycol ethyl ether propionate, ethylene glycol methyl ether acetate, ethylene glycol ethyl ether acetate, propylene glycol methyl ether acetate, propylene glycol ethyl ether acetate, propylene glycol propyl ether acetate, γ-butyrolactone, or γ-valerolactone; aprotic polar solvents such as acetonitrile, N-methylpyrrolidinone, N-ethylpyrrolidinone, N-propylpyrrolidinone, N-butylpyrrolidinone, N-hexylpyrrolidinone, N-cyclohexylpyrrolidinone, N,N-dimethylformamide, N,N-dimethylacetamide, or dimethyl sulfoxide; alcohol solvents such as methanol, ethanol, n-propanol, isopropanol, n-butanol, isobutanol, sec-butanol, t-butanol, n-pentanol, isopentanol, 2-methylbutanol, sec-pentanol, t-pentanol, 3-methoxybutanol, n-hexanol, 2-methylpentanol, sec-hexanol, 2-ethylbutanol, sec-heptanol, n-octanol, 2-ethylhexanol, sec-octanol, n-nonyl alcohol, n-decanol, sec-undecyl alcohol, trimethylnonyl alcohol, sec-tetradecyl alcohol, sec-heptadecyl alcohol, cyclohexanol, methylcyclohexanol, benzyl alcohol, ethylene glycol, 1,2-propylene glycol, 1,3-butylene glycol, diethylene glycol, dipropylene glycol, triethylene glycol, or tripropylene glycol; glycol monoether solvents such as ethylene glycol monobutyl ether, ethylene glycol monoethyl ether, ethylene glycol monophenyl ether, diethylene glycol monomethyl ether, diethylene glycol monoethyl ether, diethylene glycol mono-n-butyl ether, diethylene glycol mono-hexyl ether, triethylene glycol monoethyl ether, tetraethylene glycol mono-n-butyl ether, propylene glycol monomethyl ether, dipropylene glycol monomethyl ether, dipropylene glycol monoethyl ether, or tripropylene glycol monomethyl ether;

terpene solvents such as terpinene, terpineol, myrcene, allo-ocimene, limonene, dipentene, pinene, carvone, ocimene, or phellandrene; straight silicone oils such as a dimethyl silicone oil, a methyl phenyl silicone oil, or a methyl hydrogen silicone oil; modified silicone oils such as an amino-modified silicone oil, an epoxy-modified silicone oil, a carboxy-modified silicone oil, a carbinol-modified silicone oil, a mercapto-modified silicone oil, a heterogeneous functional group-modified silicone oil, a polyether-modified silicone oil, a methylstyryl-modified silicone oil, a hydrophilic specially-modified silicone oil, a higher alkoxy-modified silicone oil, a higher fatty acid-modified silicone oil, or a fluorine-modified silicone oil; saturated aliphatic monocarboxylic acids having 4 or more carbon atoms, such as butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, or eicosenoic acid; and unsaturated aliphatic monocarboxylic acids having 8 or more carbon atoms, such as oleic acid, elaidic acid, linoleic acid, or palmitoleic acid. In a case in which the resin composition for wavelength conversion contains a liquid medium, the resin composition for wavelength conversion may contain one liquid medium singly, or a combination of two or more liquid media.

(Other Components)

The resin composition for wavelength conversion may further contain other components such as a polymerization inhibitor, a silane coupling agent, a surfactant, an adhesion imparting agent, or an antioxidant. The resin composition for wavelength conversion may contain one kind of each of the other components singly, or a combination of two or more kinds thereof.

If necessary, the resin composition for wavelength conversion may contain a (meth)allyl compound.

(Method of Preparing Resin Composition for Wavelength Conversion)

The resin composition for wavelength conversion can be prepared by mixing the white pigment and the quantum dot phosphor, as well as the polyfunctional (meth)acrylate compound, the polyfunctional thiol compound, the photopolymerization initiator, and other components which are used if necessary, by an ordinary method. The quantum dot phosphor is preferably mixed in a state dispersed in a liquid medium.

(Application of Resin Composition for Wavelength Conversion)

The resin composition for wavelength conversion can be suitably used for forming a film. Further, the resin composition for wavelength conversion can be suitably used for forming a wavelength conversion member.

<Resin Cured Product for Wavelength Conversion>

A resin cured product for wavelength conversion according to the present disclosure is a cured product of the resin composition for wavelength conversion according to the present disclosure. The conditions for curing the resin composition for wavelength conversion are not particularly limited. In one embodiment, UV light having a wavelength of from 280 nm to 400 nm is irradiated at an irradiation dose of from 100 mJ/cm$^2$ to 5,000 mJ/cm$^2$. Examples of the UV light source to be used include a low pressure mercury lamp, a medium pressure mercury lamp, a high pressure mercury lamp, an ultra-high pressure mercury lamp, a carbon arc lamp, a metal halide lamp, a xenon lamp, a chemical lamp, a black light lamp, and a microwave-excited mercury lamp.

The glass transition temperature of the resin cured product for wavelength conversion, as measured by dynamic viscoelasticity measurement, is preferably 85° C. or higher, more preferably from 85° C. to 160° C., and still more preferably from 90° C. to 120° C.

The resin cured product for wavelength conversion according to the present disclosure can be used as a component of a wavelength conversion member.

EXAMPLES

The present invention will now be specifically described, with reference to Examples. However, the invention is in no way limited to these Examples.

Examples 1 to 3 and Comparative Examples 1 to 3

(Preparation of Resin Compositions for Wavelength Conversion)

Each of the components shown in Table 1 were mixed at the blending amounts (unit: parts by mass) shown in Table 1, to obtain each of the resin compositions for wavelength conversion of Examples 1 to 3 and Comparative Examples 1 to 3. In Table 1, the description "-" means that the corresponding component was not mixed.

As the polyfunctional (meth)acrylate compound, tricyclodecane dimethanol diacrylate (A-DCP, manufactured by Shin Nakamura Chemical Co., Ltd.) was used.

As the polyfunctional thiol compound, pentaerythritol tetrakis(3-mercaptopropionate) (PEMP, manufactured by SC Organic Chemical Co., Ltd.) was used.

As the photopolymerization initiator, 2,4,6-trimethylbenzoyl-diphenyl-phosphine oxide (IRGACURE TPO, manufactured by BASF Japan Ltd.) was used.

As the dispersion liquid of quantum dot phosphor in IBOA (isobornyl acrylate), a CdSe/ZnS (core/shell) dispersion liquid (Gen3.5 QD Concentrate, manufactured by Nanosys Inc.) was used. As the dispersion medium for this CdSe/ZnS (core/shell) dispersion liquid, isobornyl acrylate was used. The CdSe/ZnS (core/shell) dispersion liquid contains 90% by mass or more of isobornyl acrylate.

As the particles of the white pigment or inorganic particles,

R-706 (TI-PURE R-706, manufactured by The Chemours Company; material: a rutile-type titanium oxide, particle size: 0.36 μm, surface treatment: an organic polyol), R-105 (TI-PURE R-105, manufactured by The Chemours Company; material: a rutile-type titanium oxide, particle size: 0.31 μm, surface treatment: an organic silane), R-900 (TI-PURE R-900, manufactured by The Chemours Company; material: a rutile-type titanium oxide, particle size: 0.31 μm, surface treatment: none), SO-C5 (ADMAFINE SO-C5, manufactured by Admatechs co., Ltd.; material: silica, particle size: from 1.3 to 1.7 μm, surface treatment: none), and MX40T (MX40T, manufactured by Soken Chemical & Engineering Co., Ltd.; material: acrylic, particle size: 0.4 μm, surface treatment: none) were used.

TABLE 1

| Items | | Example 1 | Example 2 | Example 3 | Comparative Example 1 | Comparative Example 2 | Comparative Example 3 |
|---|---|---|---|---|---|---|---|
| Polyfunctional (meth)acrylate compound | A-DCP | 74.6 | 74.2 | 74.6 | 74.6 | 74.6 | 74.6 |
| Polyfunctional thiol compound | PEMP | 18.7 | 18.6 | 18.7 | 18.7 | 18.7 | 18.7 |
| Photopolymerization initiator | TPO | 1.0 | 1.0 | 1.0 | 1.0 | 1.0 | 1.0 |
| Quantum dot phosphor dispersion liquid | Gen3.5 QD Concentrate | 5.0 | 5.0 | 5.0 | 5.0 | 5.0 | 5.0 |
| Particles | R-706 | 0.7 | 1.2 | — | — | — | — |
| | R-105 | — | — | 0.7 | — | — | — |
| | R-900 | — | — | — | 0.7 | — | — |
| | ADMAFINE SO-C5 | — | — | — | — | 0.7 | — |
| | MX40T | — | — | — | — | — | 0.7 |

(Production of Wavelength Conversion Members)

Each of the resin compositions for wavelength conversion obtained as described above was coated on a barrier film having an average thickness of 125 μm (manufactured by Dai Nippon Printing Co., Ltd.) (coating material), to form a coating film. On the thus-formed coating film, a barrier film having a thickness of 125 μm (manufactured by Dai Nippon Printing Co., Ltd.) (coating material) was pasted. Thereafter, UV light was irradiated (at an irradiation dose of 1,000 mJ/cm$^2$) using a UV light irradiation apparatus (manufactured by Eye Graphics Co., Ltd.), to obtain each wavelength conversion member in which coating materials are disposed on both surfaces of a cured product layer including a resin cured product for wavelength conversion. Each cured product layer had an average thickness of 100 μm.

<Evaluation>

Measurement and evaluation were carried out for the following evaluation items, using each of the resin compositions for wavelength conversion and the wavelength conversion members produced in Examples 1 to 3 and Comparative Examples 1 to 3. The results are shown in Table 2.

(Brightness)

Each of the wavelength conversion members obtained as described above was cut into a width of 100 mm and a length of 100 m, as a wavelength conversion member for evaluation, and the brightness of each member for evaluation was measured using a brightness meter, PR-655 (manufactured by Photo Research). The brightness meter includes a camera unit for recognizing optical properties provided at an upper portion of the meter, and further includes, at locations below the lens, a black mask, a BEF (brightness enhancement film) plate, a diffusion plate, and an LED light source. A sample to be measured was set between the BEF plate and the diffusion plate, to carry out the measurement of the brightness.

(Appearance)

A quantity of 30 g of each of the resin compositions for wavelength conversion obtained as described above was introduced into a 50 mL screw tube. After allowing each resin composition for wavelength conversion to stand at 25° C. for 24 hours, the appearance of the composition was visually observed.

Thereafter, the appearance of each resin composition for wavelength conversion was evaluated in accordance with the following evaluation criteria.

—Evaluation Criteria—
A: No change was observed
C: Precipitation of particles was observed

TABLE 2

| | Items | Example 1 | Example 2 | Example 3 | Comparative Example 1 | Comparative Example 2 | Comparative Example 3 |
|---|---|---|---|---|---|---|---|
| Properties | Brightness | 1,460 | 1,470 | 1,480 | 1,220 | 850 | 800 |
| | Appearance | A | A | A | C | C | A |

As is evident from the results shown in Table 2, the wavelength conversion members produced from the resin compositions for wavelength conversion each containing a quantum dot phosphor and a white pigment having an organic substance layer that contains an organic substance, on at least a part of the surface of the white pigment, showed a superior brightness, as compared to the wavelength conversion members produced from the resin compositions for wavelength conversion of Comparative Examples 1 to 3. Further, it can be seen that, in the resin compositions for wavelength conversion each containing a quantum dot phosphor and a white pigment having an organic substance layer that contains an organic substance, on at least a part of the surface the white pigment, the precipitates of the white pigment are less likely to be formed, as compared to the resin composition for wavelength conversion of Comparative Example 1 or 2 containing a white pigment which does not have an organic substance layer.

All publications, patent applications, and technical standards mentioned in the present specification are incorporated herein by reference to the same extent as if each individual publication, patent application, or technical standard was specifically and individually indicated to be incorporated by reference.

What is claimed is:

1. A wavelength conversion member, comprising:
   a quantum dot phosphor;
   a white pigment comprising an organic substance layer that includes an organic substance, on at least a part of a surface of the white pigment; and a resin cured product comprising the quantum dot phosphor and the white pigment,
wherein the resin cured product comprises an alicyclic structure and a sulfide structure.

2. The wavelength conversion member according to claim 1, wherein the white pigment has a metal oxide layer, comprising a metal oxide, on at least a part of the surface of the white pigment.

3. The wavelength conversion member according to claim 2, wherein the metal oxide layer and the organic substance layer are provided in this order on the surface of the white pigment.

4. The wavelength conversion member according to claim 2, wherein the metal oxide layer comprises:
a first metal oxide layer comprising silicon dioxide; and
a second metal oxide layer comprising aluminum oxide.

5. The wavelength conversion member according to claim 1, wherein the organic substance comprises at least one of a polyol or an organic silane.

6. The wavelength conversion member according to claim 1, wherein a content of the white pigment is from 0.1% by mass to 2.0% by mass with respect to a total amount of the resin cured product.

7. The wavelength conversion member according to claim 1, wherein the white pigment comprises titanium oxide.

8. The wavelength conversion member according to claim 7, wherein the titanium oxide comprises a rutile-type titanium oxide.

9. The wavelength conversion member according to claim 1, wherein the white pigment has an average particle size of from 0.1 µm to 1 µm.

10. The wavelength conversion member according to claim 1, wherein at least a part of the white pigment is present as primary particles.

11. The wavelength conversion member according to claim 1, wherein a content of an inorganic substance other than the white pigment and the quantum dot phosphor is 0.5% by mass or less with respect to a total amount of the resin cured product.

12. The wavelength conversion member according to claim 1, wherein the quantum dot phosphor comprises a compound containing at least one of Cd or In.

13. The wavelength conversion member according to claim 1, wherein the wavelength conversion member is in a form of a film.

14. The wavelength conversion member according to claim 1, wherein the wavelength conversion member is used for displaying an image.

15. The wavelength conversion member according to claim 1, wherein the wavelength conversion member comprises a coating material that coats at least a part of the resin cured product.

16. The wavelength conversion member according to claim 15, wherein the coating material has a barrier property with respect to at least one of oxygen or water.

17. A back light unit, comprising:
the wavelength conversion member according to claim 1; and
a light source.

18. An image display device, comprising the back light unit according to claim 17.

19. A wavelength conversion member, comprising:
a quantum dot phosphor;
a white pigment comprising a metal oxide layer and an organic substance layer that includes an organic substance, the metal oxide layer and the organic substance layer being on at least a part of a surface of the white pigment; and
a resin cured product comprising the quantum dot phosphor and the white pigment,
wherein the metal oxide layer comprises a first metal oxide layer comprising silicon dioxide, and a second metal oxide layer comprising aluminum oxide.

20. The wavelength conversion member according to claim 19, wherein the metal oxide layer and the organic substance layer are provided in this order on the surface of the white pigment.

21. The wavelength conversion member according to claim 19, wherein the organic substance comprises at least one of a polyol or an organic silane.

22. The wavelength conversion member according to claim 19, wherein a content of the white pigment is from 0.1% by mass to 2.0% by mass with respect to a total amount of the resin cured product.

23. The wavelength conversion member according to claim 19, wherein the white pigment comprises titanium oxide.

24. The wavelength conversion member according to claim 23, wherein the titanium oxide comprises a rutile-type titanium oxide.

25. The wavelength conversion member according to claim 19, wherein the white pigment has an average particle size of from 0.1 µm to 1 µm.

26. The wavelength conversion member according to claim 19, wherein at least a part of the white pigment is present as primary particles.

27. The wavelength conversion member according to claim 19, wherein a content of an inorganic substance other than the white pigment and the quantum dot phosphor is 0.5% by mass or less with respect to a total amount of the resin cured product.

28. The wavelength conversion member according to claim 19, wherein the quantum dot phosphor comprises a compound containing at least one of Cd or In.

29. The wavelength conversion member according to claim 19, wherein the wavelength conversion member is in a form of a film.

30. The wavelength conversion member according to claim 19, wherein the wavelength conversion member is used for displaying an image.

31. The wavelength conversion member according to claim 19, wherein the wavelength conversion member comprises a coating material that coats at least a part of the resin cured product.

32. The wavelength conversion member according to claim 31, wherein the coating material has a barrier property with respect to at least one of oxygen or water.

33. A back light unit, comprising:
the wavelength conversion member according to claim 19; and
a light source.

34. An image display device, comprising the back light unit according to claim 33.

35. The wavelength conversion member according to claim 19, wherein the first metal oxide layer, the second metal oxide layer, and the organic substance layer are provided in this order on the surface of the white pigment.

* * * * *